May 3, 1932.  E. V. CROWELL  1,856,469
TUBING SUPPORT
Filed Nov. 9, 1929
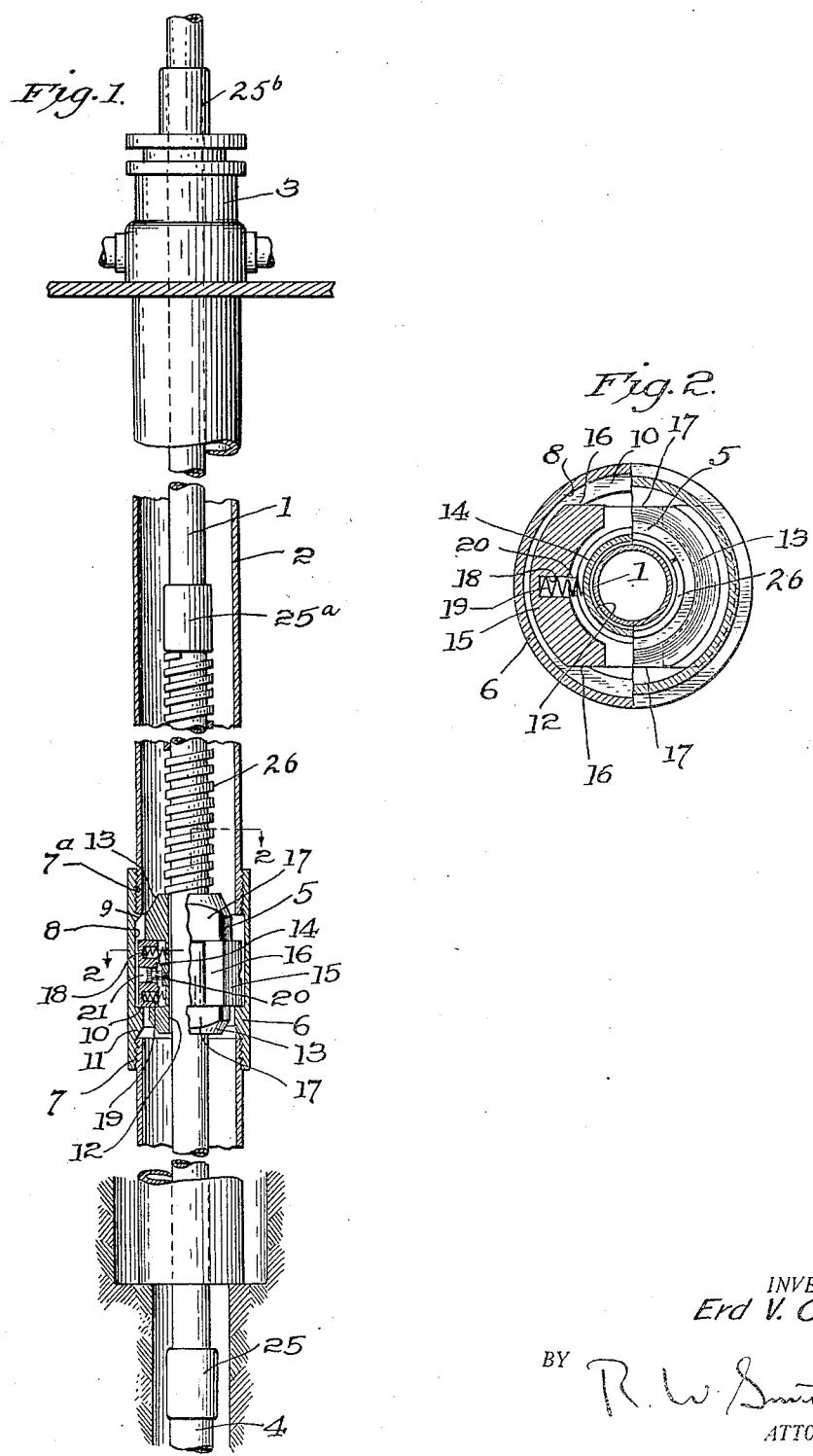
INVENTOR.
Erd V. Crowell.
BY R. W. Smith
ATTORNEY.

Patented May 3, 1932

1,856,469

UNITED STATES PATENT OFFICE

ERD V. CROWELL, OF LOS ANGELES, CALIFORNIA

TUBING SUPPORT

Application filed November 9, 1929. Serial No. 405,940.

This invention is a supporting means for well tubing and has for its object to relieve the tubing of tensile strain and lateral vibration and also avoid excessive longitudinal stress in the event of the tubing axially expanding.

More particularly it is an object of the invention to support the tubing from any desired level in a well so as to hold the tubing against lateral vibration and relieve it of tensile strain, and to provide a resilient abutment between the tubing and its support adapted to longitudinally yield for axial movement of the tubing relative to its support in the event of such heat expansion of the tubing as would otherwise result in excessive longitudinal stress.

Further objects of the invention will be readily understood from the following description of the accompanying drawings, in which:

Fig. 1 is a side elevation, partly in axial section, showing the tubing supporting means in operative position.

Fig. 2 is a transverse section on the line 2—2 of Fig. 1.

The supporting means is employed in connection with a usual string of tubing 1 which is adapted for suspension in well casing 2 by means of a usual casing head 3, with the working barrel 4 of a usual pump suspended from the string of tubing for pumping oil in usual manner.

A support for the string of tubing is mounted in casing 2 at a predetermined level, with the tubing extending longitudinally therethrough so that the support holds the tubing against lateral vibration and also longitudinally supports the same for relieving the tubing of at least a part of the tensile strain. The support may be of the type described and claimed in my prior Patent No. 1,447,965 of March 13, 1923, and as an instance of such construction the support is shown as a cage 5 adapted to be lowered and held in casing 2 at a coupling 6 which is provided in the string of casing at any predetermined level.

The coupling 6 is threaded to proximate ends of adjacent lengths of the casing as shown at 7, and is interiorly formed with an annular channel 8, the upper wall of which is inclined inwardly and upwardly as shown at 9, and the lower wall of which projects inwardly to form a seat 10, with the under surface of the seat inclined outwardly and downwardly as shown at 11.

The cage 5 is longitudinally bored at 12 to slidably receive the string of tubing 1, and the ends of the cage are preferably tapered as shown at 13 to facilitate insertion and withdrawal of the cage from the coupling 6. Between its tapered ends the cage is formed with an exterior annular groove 14 adapted to receive locking slips 15 which are substantially semicircular but provided with flattened ends 16 to permit free flow of gas upwardly through casing 2, and opposite sides of the exterior surface of cage 5 may be flattened for a similar purpose as shown at 17.

Each slip 15 is recessed at its inner surface so as to provide axially spaced sockets 18 which are adapted to partially house expansion springs 19, and the inner ends of the springs bear against the base of groove 14 so as to tend to outwardly shift the slips for seating engagement on the seat 10 of coupling 6. The movement of the slips may be restricted by bolts 20 which slidably fit in pockets 21 formed in the outer surfaces of the slips, with the inner ends of the bolts extending through suitable openings at the inner ends of the pockets and threaded into the wall of cage 5.

The cage 5 is mounted on tubing 1 at a point above the working barrel 4 and between usual tubing couplings 25, and is lowered with the tubing through casing 2, with the springs 19 readily yielding for retraction of slips 15 so that they will slide downwardly through the casing. When the cage alines with coupling 6 the slips 15 are projected by their springs 19 so as to engage seat 10 and thus lock the cage against further downward movement while readily permitting subsequent withdrawal of the cage along with the tubing as a result of the inclined wall 9 of cage 6 engaging and retracting the slips.

The cage 5 when locked in coupling 6 supports the string of tubing extending through the bore of the cage and thereby relieves the tubing of tensile strain and holds it against lateral vibration; and in order to avoid excessive longitudinal stress in that portion of the string of tubing which extends upwardly from the cage 5 to the casing head 3, even in the event of the tubing being appreciably expanded by heat, the present invention provides a resiliently yieldable supporting abutment between the tubing and cage. The tubing may thus move downwardly through the cage for relieving excessive longitudinal stress whenever the tubing is subjected thereto from any cause; and the construction is such as to maintain the resiliently yieldable support for the tubing even at the maximum longitudinal movement which is liable to occur.

As an instance of this construction the parts are so arranged that when the string of tubing has been lowered through the bore of casing 2 so as to position the working barrel 4 at the desired level, the tubing coupling 25$^a$ which is next above cage 5 will be appreciably spaced above the cage as shown in Fig. 1, and a spring 26, shown as a relatively heavy coil spring, encircles tubing 1 with its lower end abutting against cage 5 and its upper end engaging beneath coupling 25$^a$. It will thus be seen that with the string of tubing supported at its upper end by coupling 25$^b$ engaging casing head 3, and the spring 26 forming a yieldable support for the tubing just above the cage 5 and being of such tension as to support the tubing without maximum compression of the spring, the string of tubing is relieved of tensile strain and is also held against lateral vibration; but the tension of the spring is such that in the event of excessive longitudinal stress in the tubing, such for example as would result from heat expansion of the tubing between the couplings 25$^a$–25$^b$, the spring 26 readily yields for movement of the tubing downwardly through cage 5 until such excessive longitudinal stress is relieved. At the same time the spring is of such applicable length, that even at the appreciable maximum longitudinal movement of the tubing which is liable to occur, the spring is not fully compressed but still provides a resiliently yieldable support for the tubing.

The invention thus provides for supporting a string of tubing so as to relieve it of tensile strain and lateral vibration with the supporting means adapted to readily yield responsive to excessive longitudinal stress, but still maintaining a resiliently yieldable support for the tubing and thereby avoiding distortion of that portion of the string of tubing which projects upwardly from the supporting means and is fixed relative to the well casing at the casing head.

I claim:

1. In combination, tubing adapted for suspension in a well, an anchor adapted for anchoring in the well, and means between the tubing and the anchor for yieldably supporting the tubing with relation to the anchor, the yieldable supporting means being adapted to maintain a yieldable support for the tubing even upon appreciable longitudinal movement of the tubing with relation to the anchor.

2. In combination, tubing adapted for suspension in a well, an anchor adapted for anchoring in the well, and means between the tubing and the anchor for yieldably supporting the tubing with relation to the anchor, the yieldable supporting means being adapted to maintain a yieldable support for the tubing even at the maximum longitudinal heat expansion of the tubing which is liable to occur.

3. In combination, tubing adapted for suspension in a well, an anchor adapted for anchoring in the well, and a coil spring encircling the tubing and yieldably supporting the tubing with relation to the anchor, the spring being of such appreciable length as to not reach its limit of compression but maintain a yieldable support for the tubing even upon appreciable longitudinal movement of the tubing with relation to the anchor.

4. In combination, tubing adapted for suspension in a well, an anchor adapted for anchoring in the well, and a coil spring encircling the tubing and yieldably supporting the tubing with relation to the anchor, the spring being of such appreciable length as to not reach its limit of compression but maintain a yieldable support for the tubing even at the maximum longitudinal heat expansion of the tubing which is liable to occur.

5. In combination, an anchor adapted to be anchored at an appreciable depth in a well, and a resiliently yieldable abutment resting on the anchor with a string of tubing which is suspended in the well resting upon the yieldable abutment, the resiliently yieldable abutment being of such tension as to support the tubing so as to relieve it of tensile strain but adapted to yield in accordance with longitudinal stress in the tubing so as to permit longitudinal movement of the tubing relative to the support, and the resiliently yieldable abutment being adapted to maintain said yieldable support even upon appreciable longitudinal movement of the tubing with relation to the anchor.

6. In combination, an anchor adapted to be anchored at an appreciable depth in a well, and a coil spring resting on the anchor with a string of tubing which is suspended in the well resting upon the spring, the spring being of such tension as to support the tubing so as to relieve it of tensile strain but adapted to yield in accordance with longitudinal stress in the tubing so as to permit longitudinal movement of the tubing relative to the support, and the spring being of such appreciable length as to not reach its limit of compression but maintains a yieldable support for the tubing even upon appreciable longitudinal movement of the tubing with relation to the anchor.

7. In combination, an anchor adapted to be anchored at an appreciable depth in a well, and a coil spring resting on the anchor with a string of tubing which is suspended in the well resting upon the spring, the spring being of such tension as to support the tubing so as to relieve it of tensile strain but adapted to yield in accordance with heat expansion of the tubing so as to permit longitudinal movement of the tubing relative to the support, and the spring being of such appreciable length as to not reach its limit of compression but maintain a yieldable support for the tubing even at the maximum longitudinal heat expansion of the tubing which is liable to occur.

In testimony whereof I have affixed my signature.

ERD V. CROWELL.